Jan. 20, 1953   F. W. JESSOP   2,626,175
LOAD SUSPENSION LINK

Filed March 15, 1948   2 SHEETS—SHEET 1

INVENTOR.
FRANK W. JESSOP
BY
Harry P. Canfield
ATTORNEY.

Jan. 20, 1953      F. W. JESSOP      2,626,175
LOAD SUSPENSION LINK

Filed March 15, 1948      2 SHEETS—SHEET 2

INVENTOR.
FRANK W. JESSOP
BY
Harry P. Canfield
ATTORNEY.

Patented Jan. 20, 1953

2,626,175

UNITED STATES PATENT OFFICE 2,626,175

LOAD SUSPENSION LINK

Frank W. Jessop, Cleveland, Ohio

Application March 15, 1948, Serial No. 14,841

8 Claims. (Cl. 294—78)

This invention relates to chain type suspensions by which a load may be suspended from a crane hook or other carrier and raised and lowered and transported from place to place; and relates more particularly to such supports in which a plurality of chains are attached at one end to the load at spaced points thereon and at their other ends are all looped or linked into a single common carrier link.

The invention is applicable to use in various arts as will become apparent hereinafter. However, in order to present clearly the problem solved by the invention and in order to present a concrete embodiment of the invention as required by law in a patent application I have chosen to illustrate and describe it as applied to a lifting-magnet as the load.

The conventional lifting-magnet is in the general form of a thick disc, horizontal when in use. It has three chains hingingly connected to its upper side at three symmetrically spaced points, that is, equally distant from the disc axis and 120° apart. For obvious reasons of appearance, economy, symmetry, etc., the chains are all alike, particularly as to length. At their upper ends, the end links of the chains are all three linked into a common generally oval, vertical carrier link, by which the magnet is to be lifted by a crane hook or the like.

When the weight of the magnet is suspended by the chains and carrier link, it is highly desirable for the magnet to be horizontal, not merely in order to give the appearance of good design, but to afford full control of the positioning of the magnet when lowered upon a load to be lifted, and full control of the operation of the magnet, etc.

However, the geometry of the assembly makes it impossible to have the magnet horizontal when it is suspended by three chains all of the same length and with their upper end links all linked with a single vertical oval carrier link. One of the end links can rest in the bottom or lowest part of the carrier link; but then the other two cannot. They have to take up positions at the sides of that one, and spaced apart, and higher up on the curve of the carrier link. The effect is the same as if one of the chains were longer than the other two. Consequently, the magnet tips out of the horizontal and is suspended in that condition.

Furthermore and of perhaps even greater importance, when the weight of the magnet and its load are suspended, the three upper end links as just described are wedged down into the lower end of the carrier link with great pressure, and bind upon the carrier link and upon each other with great friction; and in the operation of the magnet the relative movement of the links rapidly wears them. The larger sizes of lifting magnet have been known to wear out their chains in this manner in only three months of regular use, with attendant expense of replacement at the end of that period, and progressively increasing danger to operators in the meantime.

Attempts have been made to lubricate the links at these wear surfaces but with little gain because no practical way presents itself for retaining the lubricant at the points of wear.

It is the primary objects of this invention to provide a novel construction of carrier link, and chain assembly by which these objections are obviated.

Other objects will become apparent hereinafter to those skilled in the art to which the invention appertains.

The invention itself is set forth in the appended claims.

An illustrative embodiment of the invention is set forth in the following description taken in connection with the accompanying drawing, in which.

Figure 1:
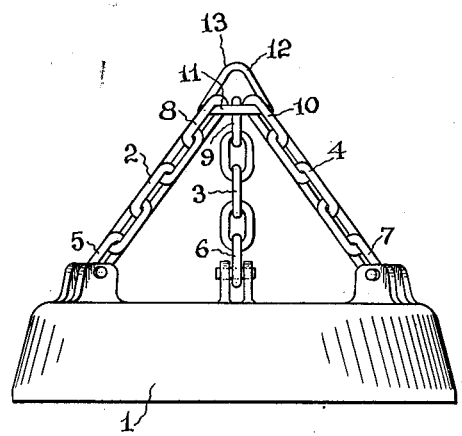
Fig. 1 is a side elevational view of a lifting magnet, a carrier link, and my suspension chains, embodying my invention, in one form thereof.
Figure 2:
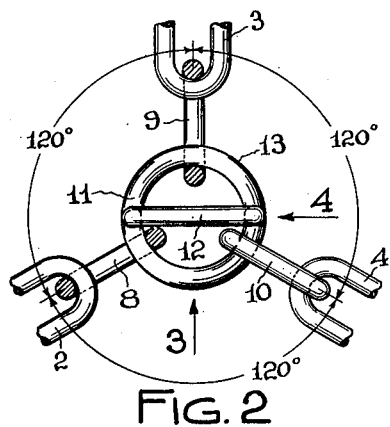
Fig. 2 is a top plan view of Fig. 1 to enlarged scale with parts broken away; to show more clearly the carrier link and the chains of Fig. 1.
Figure 5:
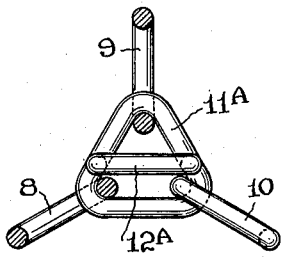
Figure 3:
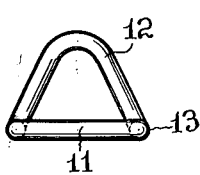
Figure 4:
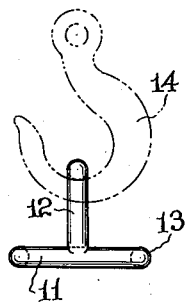
Figure 6:
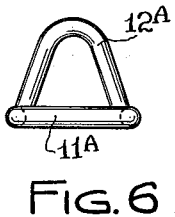
Figure 11:
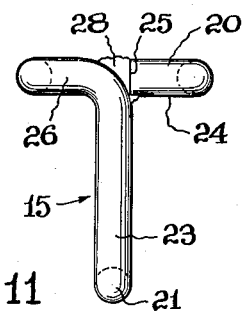
Figure 8:
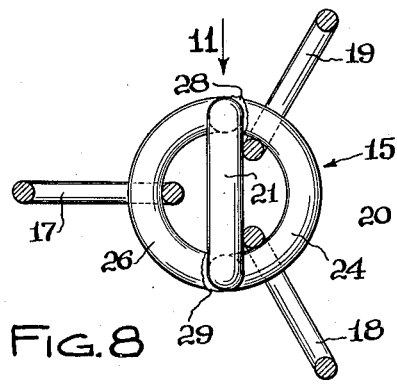
Figures 7, 9:
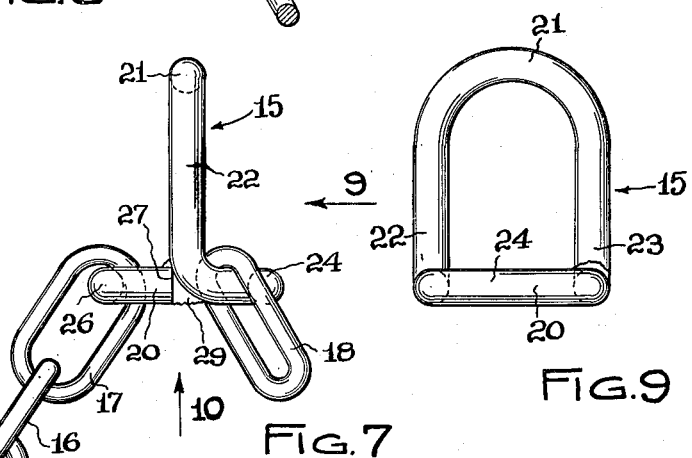
Figure 10:
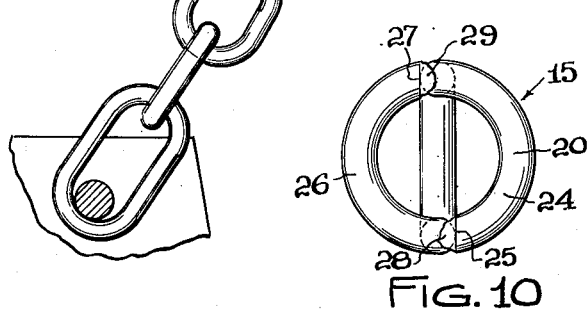

Figs. 3 and 4 are views illustrating the carrier link of Fig. 2, and taken respectively in the direction of the arrows 3 and 4 of Fig. 2;

Figs. 5 and 6 are views similar to Figs. 2 and 3 respectively showing a modification of the carrier link of Figs. 2, 3, and 4;

Fig. 7 is a view similar to a part of Fig. 1, to a larger scale, illustrating another form of carrier link and chain;

Fig. 8 is a top plan view of Fig. 7 with the chain links thereof broken away along section planes;

Fig. 9 is a view of the carrier link of Fig. 7 taken in the direction of the arrow 9 of Fig. 7;

Fig. 10 is a view of the carrier link of Fig. 7 taken in the direction of the arrow 10 of Fig. 7;

Fig. 11 is a view of the carrier link of Fig. 7 taken in the direction of the arrow 11 of Fig. 8.

Referring to the drawing, Fig. 1 shows at 1 a lifting magnet proper, of the conventional thick disc form (although simplified for illustration purposes) having three suspension chains 2—3—4 hinged by their lower end links 5—6—7 to the top of the magnet, at points equally distant from a central axis of the magnet, and in a common plane, and with the links 5—6—7 lying in radial planes and angularly spaced 120° apart around the central axis of the magnet.

The chains 2—3—4 for advantages of simplicity, economy of manufacture, etc., are all alike, and of equal length. Each chain preferably comprises an odd number of links so that the upper end links 8—9—10 may also naturally lie in radial planes, spaced angularly 120° apart around the central axis.

A horizontal link 11, preferably circular, is linked through all of the upper chain links 8—9—10. A lifting loop 12 generally of inverted U-form, extends upwardly from the link 11, integrally joined by its legs to the link 11 at diametrically opposite points thereof. The closed end or reentrant portion of the U-shaped lifting loop 12 lies in the central axis.

Figs. 2, 3, and 4 show separately the link 11 and loop 12 as a unit, which may now be referred to, as a whole, as a carrier link 13. Indicated in Fig. 2 are the upper end chain links 8—9—10 and their 120° relation; and in Fig. 4 is indicated at 14, a crane hook, hooked through the loop 12 in position to lift the magnet.

When the magnet is out of use, it will be resting in its upright position illustrated in Fig. 1, but the chains will be all collapsed and lying on top of the magnet. Because of the shape and contours of the carrier link 13, as it lies on top of the magnet, some part or all of the lifting loop 12 will be readily accessible to be engaged by a crane hook; and upon hoisting of the hook, the carrier link 13 will rise and straighten out the collapsed chains; and as load tension develops in them, the upper end links 8—9—10 will slide along the link 11 and take up their 120° positions at which the suspension force will be equal in all of the chains, and the magnet will hang suspended in desired balanced horizontal position, as referred to, and without wearing friction on the link 13, link 11 or links 8—9—10.

As illustrating the scope of the invention, there is shown in Fig. 5, a modification comprising means to insure that the upper end links 8—9—10 will take up their 120° positions when load tension comes thereon. In this form, the link, here 11A, is not circular, but in the form of an equilateral triangle, with rounded corners. The lifting loop, here 12A, is bridgingly connected to two legs of the triangle.

The mode of operation and the advantages of this form are the same as of the other form with the further advantage mentioned, that the upper end links 8—9—10 may more readily take up their 120° positions, by sliding along the legs of the triangle.

In practice, the loop 12 (or 12A) and the ring 11 (or 11A) will preferably be made separately and welded together. For larger sizes and weights of magnet the size and cross sectional area of the ring and loop as well as of the chain links will be greater.

For very large and heavy magnets for lifting correspondingly heavy loads, the loop and ring may have to be so great in cross sectional area that the cost of making the welds joining them may become prohibitive.

In such cases, I prefer to employ the construction of carrier link and chains shown in Figs. 7 to 11 inclusive.

In Figs. 7 to 11, the carrier link is shown at 15 and one suspension chain at 16, having an upper link 17, the other two chains being indicated by their upper links 18 and 19.

The carrier link 15 comprises a link portion 20, which is approximately circular and in use horizontal; and a loop portion 21, extending upwardly from diametrically opposite portions of the ring; and the carrier link as a whole is therefore similar in appearance to the one of Figs. 1 to 4; but the carrier link of Figs. 7 to 11 is made all in one piece, bent from round stock.

The procedure and steps of the method in forming this carrier link 15, may be varied. In general, however, the loop 21 has two vertical side legs 22—23. At the lower end of the vertical side leg 22, it bends into the horizontal and continues in a half circle 24 terminating as at 25, see Figs. 10 and 11. The lower end of the vertical side leg 23, similarly bends into a horizontal half circle 26 in the plane of the half circle 24, terminating as at 27, Figs. 7 and 10.

The end 25 of the half circle 24 is welded to the curved juncture of the leg 23 and half circle 26 by a weld 28, best shown in Fig. 11; and the end 27 of the half circle 26 is welded to the rounded juncture of the vertical leg 22 and horizontal half circle 24, by a weld 29 best shown in Fig. 7.

The stock may be bent to form the loop 21 either before or after the two half circles 24 and 26 have been bent.

The mode of operation and advantages of this carrier link 15 are the same as of the form of Figs. 1 to 4; and has the further advantage that a considerable saving of cost in producing it is effected over that for the first described form when the stock or material of the latter is of the large cross-section necessary for maximum loads.

It is not essential for the lifting loop (12, 12A or 21) to be disposed so that it lies as a whole in a plane through the central axis of the link (11, 11A, or 26). It is sufficient if the closed end or re-entrant portion of the lifting loop at the point where the crane hook pulls on it, is on that axis. Also, it is not essential for the links to all lie in a plane at right angles to the central axis. It is sufficient if the link has three portions in such plane for linking with the upper end links of the three chains.

The invention is set forth in the following claims; and the foregoing embodiments, by their diversity, show that changes and modifications may be made therein without departing from the spirit of the invention or sacrificing its advantages. For example the triangular form of the link of Figs. 5 and 6 and the circular form of the links of the other figures, constitutes one kind of means for causing the end links of the three chains to occupy positions 120° apart around the link axis when load is on the chains; and other means may occur to those skilled in the art to accomplish this end; and the invention is comprehensive of all such changes and modifications which come within the scope of the appended claims.

I claim:

1. A carrier link for connection with the three chains of a three chain load-suspension, and for engagement by a crane hook or like load lifting means, comprising a closed link element having three chain connection portions in a common plane, symmetrically disposed about a common axis at right angles to the plane; and a generally U-shaped loop element for lifting means engagement bridging opposite portions of the link element and having a re-entrant portion in the said axis.

2. A carrier link for connection with the three chains of a three chain load-suspension, and for engagement by a crane hook or like load lifting means, comprising a circular chain connection link element lying in a plane; and a loop element for lifting means engagement connected to the link element, and having a re-entrant portion lying in the central axis of the circular link element.

3. A carrier link for connection with the three chains of a three chain load-suspension, and for engagement by a crane hook or like load lifting means, comprising a circular chain connection link element lying in a plane; and a generally U-shaped loop element for lifting means engagement bridging opposite portions of the link element and its closed end lying in the central axis of the link element.

4. A carrier link for connection with the three chains of a three chain load-suspension, and for engagement by a crane hook like load lifting means, comprising a link element of equilateral triangle form having the corners thereof lying in a plane for chain connection, and a loop element connected to the link element and having a re-entrant portion lying in the central axis of the link element.

5. A chain suspension constructed for connection to a portable load, at three points thereof and for detachable engagement by a crane hook or like lifting means for lifting the load, comprising: three chains of substantially equal length having each a link at one end for connection with the load; a closed link element of generally circular cross section having three portions in a common plane symmetrically disposed about a central axis of the link element and respectively linked with the chains at their other ends; and a generally U-shaped loop element for lifting means engagement bridging opposite portions of the closed link element and connected thereto and having a re-entrant portion in the said axis.

6. A carrier link for connection with the three chains of a three chain load-suspension and for engagement by a crane hook or like load lifting means, the carrier link being made from bar metal, and comprising a loop element of generally U-shape, for lifting means engagement, and each side leg of the U-shape continuing into a semi-circular link portion, the two semi-circular portions disposed to provide a circular link in a plane, for chain link connection, and with the axis of the circle going through the closed end of the loop element.

7. A carrier link for connection with the three chains of a three chain load-suspension and for engagement by a crane hook or like load lifting means, the carrier link being made from bar metal, and comprising a loop element of generally U-shape, for lifting means engagement, and each side leg of the U-shape continuing into a semi-circular link portion, the two semi-circular portions disposed to provide a circular link in a plane, for chain link connection, and with the axis of the circle going through the closed end of the loop element; and the end of each semi-circular portion being welded to the side leg that is continuous with the other semi-circular portion.

8. A chain suspension for connection to a portable load at three points thereof symmetrically disposed about a central axis of the load, and for detachable engagement by a crane hook or like lifting means for lifting the load, comprising three chains of substantially equal length each having a link at one end for connection with the load; a closed link element having three portions in a common plane symmetrically disposed about a central axis of the link element and linked with the chains at their outer ends; a loop element for lifting means engagement joined to the link element and having a re-entrant portion in the said axis; and means causing the chain links that are linked with the link element, to take up positions on the link element at said three portions of the link element, when the chains are under load.

FRANK W. JESSOP.

REFERENCES CITED

The following references are of record in the file of this patent:

UNITED STATES PATENTS

| Number | Name | Date |
| --- | --- | --- |
| 1,047,954 | Krohne | Dec. 24, 1912 |
| 1,360,686 | Robinson | Nov. 30, 1920 |
| 1,396,463 | Recker | Nov. 8, 1921 |
| 2,288,793 | Delano | July 7, 1942 |
| 2,446,973 | Zeigler | Aug. 10, 1948 |

FOREIGN PATENTS

| Number | Country | Date |
| --- | --- | --- |
| 171,128 | Germany | May 21, 1906 |
| 131,540 | Great Britain | Jan. 24, 1919 |
| 547,176 | Great Britain | Aug. 17, 1942 |
| 436,786 | France | Feb. 2, 1912 |